(12) United States Patent
Murawski et al.

(10) Patent No.: US 11,339,883 B2
(45) Date of Patent: May 24, 2022

(54) FLUID PRESSURE REGULATOR

(71) Applicant: Goodrich Corporation, Charlotte, NC (US)

(72) Inventors: Tomasz Murawski, Trzebnica (PL); Dariusz Sapija, Jelcz Laskowice (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/711,811

(22) Filed: Dec. 12, 2019

(65) Prior Publication Data
US 2020/0386335 A1  Dec. 10, 2020

(30) Foreign Application Priority Data
Jun. 6, 2019  (EP) .................................... 19178836

(51) Int. Cl.
| B64D 25/14 | (2006.01) |
| F16K 15/20 | (2006.01) |
| F16K 15/02 | (2006.01) |
| G05D 16/06 | (2006.01) |

(52) U.S. Cl.
CPC ............ F16K 15/202 (2013.01); B64D 25/14 (2013.01); F16K 15/021 (2013.01); G05D 16/0613 (2013.01); G05D 16/0652 (2013.01)

(58) Field of Classification Search
CPC .... B64D 25/14; G05D 16/04; G05D 16/0613; G05D 16/0652; Y10T 137/7823; Y10T 137/7825; Y10T 137/8733
See application file for complete search history.

(56) References Cited

U.S. PATENT DOCUMENTS

| 2,590,396 A | * | 3/1952 | Garretson | .......... G05D 16/0613 |
| | | | | 137/484.8 |
| 3,664,369 A | | 5/1972 | Johnson | |
| 3,742,972 A | * | 7/1973 | Hughes | .............. G05D 16/0404 |
| | | | | 137/110 |
| 4,071,039 A | * | 1/1978 | Goof | ........................ F16K 7/04 |
| | | | | 137/494 |
| 5,088,516 A | | 2/1992 | Fisher | |
| 5,906,340 A | * | 5/1999 | Duggal | .................. B64D 25/14 |
| | | | | 182/48 |
| 6,321,770 B1 | * | 11/2001 | Hintzman | .............. B64D 25/14 |
| | | | | 137/68.23 |

(Continued)

FOREIGN PATENT DOCUMENTS

| CH | 208807 A | 2/1940 |
| FR | 1398953 A | 5/1965 |
| GB | 1096323 A | 12/1967 |

OTHER PUBLICATIONS

Machine translation CH 208807A.*
European Search Report for Application No. 19178836.3, dated Dec. 6, 2019, 7 pages.

*Primary Examiner* — Kevin F Murphy
(74) *Attorney, Agent, or Firm* — Cantor Colburn LLP

(57) ABSTRACT

A fluid pressure regulator includes at least one fluid inlet conduit for connection to a pressurised fluid source, an outlet conduit, and an elastically expansible chamber arranged between the at least one fluid inlet conduit and the outlet conduit. The elastically expansible chamber being configured to elastically deform the at least one fluid inlet conduit upon expansion to modify the cross sectional area of the at least one fluid inlet conduit.

15 Claims, 3 Drawing Sheets

(56) References Cited

U.S. PATENT DOCUMENTS

2004/0009107 A1\* 1/2004 Baker .................... B64D 25/14
                                                      422/242
2015/0192934 A1\* 7/2015 Lis ..................... G05D 16/0402
                                                      137/1

\* cited by examiner

FLUID PRESSURE REGULATOR

FOREIGN PRIORITY

This application claims priority to European Patent Application No. 19178836.3 filed Jun. 6, 2019, the entire contents of which is incorporated herein by reference.

TECHNICAL FIELD

The present disclosure relates to fluid pressure regulators.

BACKGROUND

Fluid pressure regulators are used in a variety of fields to ensure that an output pressure of a fluid remains within predetermined limits for a given application, even if an input pressure of the fluid varies, such as may be provided by a gas supplied from a fixed volume gas reservoir.

One application of a pressure regulator is in an aircraft evacuation system, where gas from a pressurised gas reservoir is used to inflate an evacuation slide, typically by use of an aspirator. Aspirators make use of the Venturi effect to create an air flow. A fluid passes across an orifice and thereby creates a pressure differential. The pressure differential causes the air flow which may be used, for example, to inflate an evacuation slide of an aircraft.

There is an optimum rate for the gas to pass across the orifice. Use of a fluid pressure regulator allows the flow of fluid from the gas reservoir across the orifice to be maintained at or near the optimum rate.

U.S. Pat. No. 3,664,369 discloses a prior art pressure reducing regulator with a complex design.

There is a need for simplification of the design for fluid pressure regulators that reduce the cost and time of manufacture of said regulators.

SUMMARY

From one aspect, there is provided a fluid pressure regulator that includes at least one fluid inlet conduit for connection to a pressurised fluid source, an outlet conduit, and an elastically expansible chamber arranged between the at least one fluid inlet conduit and the outlet conduit, the elastically expansible chamber being configured to elastically deform the at least one fluid inlet conduit upon expansion to modify the cross sectional area of the at least one fluid inlet conduit.

The pressure regulator may include a plurality of fluid inlet conduits, each deformable by the elastically expansible chamber upon expansion thereof.

The fluid inlet conduits may be circumferentially symmetrically arranged about a centreline of the outlet conduit.

The pressure regulator may include a manifold connecting the fluid inlet conduits.

The elastically expansible chamber may include at least one deforming element on an external surface thereof for engaging a respective fluid inlet conduit.

The pressure regulator may include a housing surrounding the at least one fluid inlet conduit and the outlet conduit.

The housing may include at least one anvil element on an internal surface thereof opposed to the deforming element whereby the fluid inlet conduit is deformed between the deforming element and the anvil element.

The expansible chamber may include a balloon.

The expansible chamber may include a non-expansible portion and at least one expansible portion, wherein each of the at least one expansible portions is configured upon expansion to modify the cross sectional area of a respective one of the at least one fluid inlet conduits.

The expansible chamber may include a flexible material.

The expansible chamber may be metallic, elastomeric or composite.

The pressure regulator may be additively manufactured.

From another aspect, there is provided an aircraft evacuation system that includes: an inflatable evacuation slide; a fluid pressure regulator as described in any of the embodiments above; and a pressurised fluid source connected to the at least one inlet conduit of the pressure regulator, wherein the system is configured to inflate the evacuation slide using flow from the outlet conduit of the pressure regulator.

The aircraft evacuation system may include an aspirator wherein the system is configured to inflate the evacuation slide by the flow from the outlet conduit of the pressure regulator inducing a pressure differential in the aspirator to induce air into the evacuation slide.

The aircraft evacuation system may include a plurality of pressurised fluid sources each connected to a respective inlet conduit of the pressure regulator.

BRIEF DESCRIPTION OF THE DRAWINGS

Some embodiments of the disclosure will now be described by way of example only, with reference to the accompanying drawings in which.

DETAILED DESCRIPTION

Figure 1:
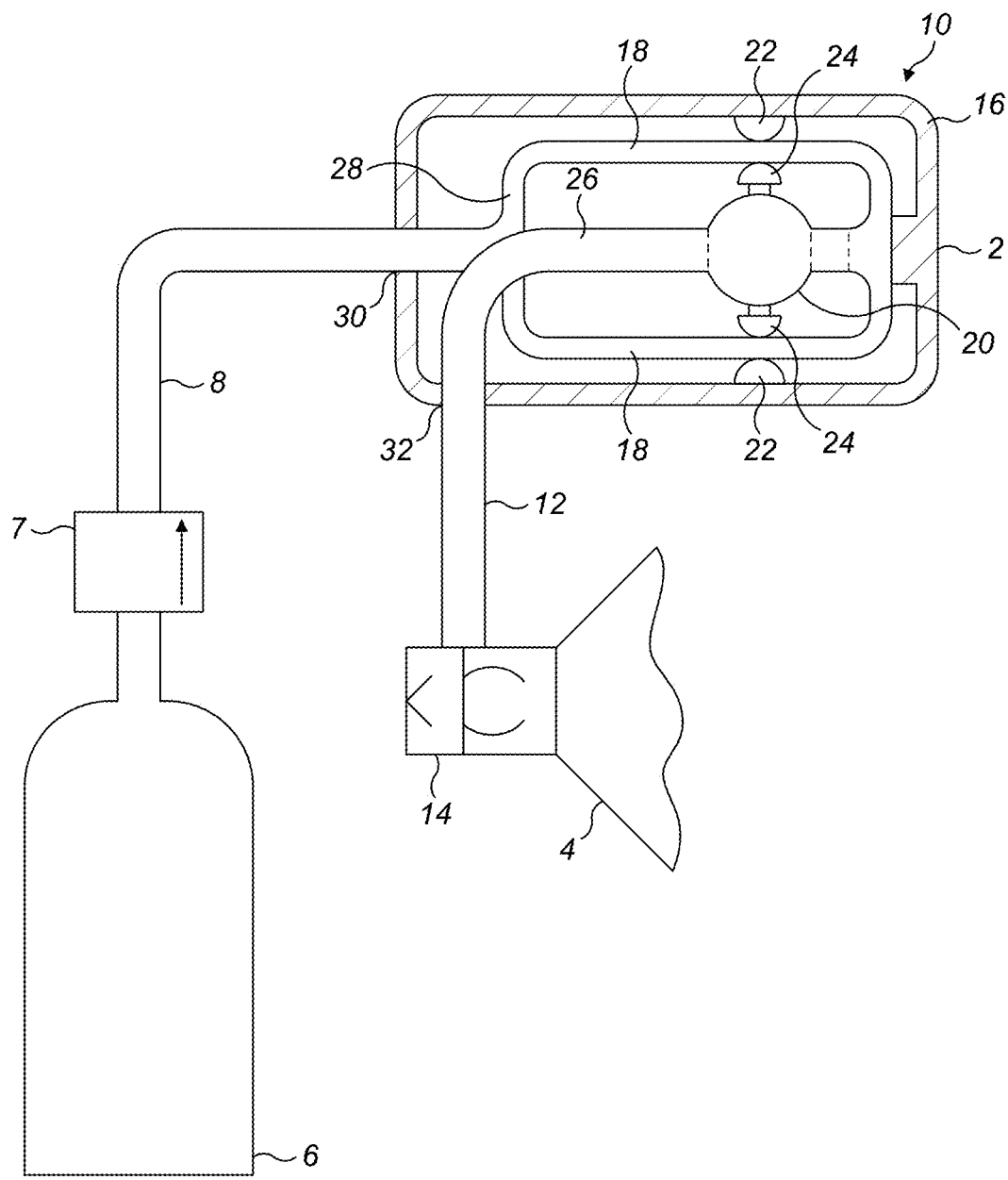
FIG. 1 schematically illustrates an aircraft evacuation inflation system.

FIG. 1 schematically illustrates an inflation system 2 for an aircraft evacuation slide 4. The inflation system 2 includes a pressurised fluid source 6, a valve 7, an inlet passage 8, a pressure regulator 10, an outlet passage 12, and an aspirator 14.

The pressurised fluid source 6 may be a pressurised gas bottle 6. The pressurised fluid source 6 supplies gas, via the valve 7, to the inlet passage 8 at a pressure which will vary with time. The valve 7 may be opened or closed to respectively allow or prevent flow of the gas from the pressurised fluid source 6. The valve 7 may be controlled either by manual operation or by automated systems. The inlet passage 8 connects the pressurised fluid source 6 to the pressure regulator 10.

The pressure regulator 10 includes a housing 16, at least one regulator inlet conduit 18, an elastically expansible chamber 20, at least one anvil element 22 such as an external clamp 22, at least one deforming element 24 such as an internal clamp 24, and a regulator outlet conduit 26. The pressure regulator 10 may, as illustrated, include a plurality of regulator inlet conduits 18, and a plurality of corresponding anvil and deforming elements 22, 24.

In the embodiment where the pressure regulator 10 includes a plurality of regulator inlet conduits 18, the pressure regulator may also include a manifold 28 connecting the plurality of regulator inlet conduits 18 to the inlet passage 8. The regulator inlet conduits 18 may be arranged circumferentially symmetrically about a centreline of the regulator outlet conduit 26.

In some embodiments including a plurality of regulator inlet conduits 18, the inlet conduits 18 may be connected to different pressurised fluid sources, with different inlet pressures.

The housing 16 surrounds and supports the at least one regulator inlet conduit 18, the expansible chamber 20, the anvil and deforming elements 22, 24, and the regulator outlet conduit 26. The housing 16 in the illustrated embodiment also includes ports 30, 32 for the inlet and outlet passages 8, 12 respectively.

The conduits 18, 26 and expansible chamber 20 may be arranged such that the direction of the fluid flow through the at least one regulator inlet conduit 18 is opposite to the direction of the fluid flow through the expansible chamber 20 and the regulator outlet conduit 26.

The anvil elements 22 are connected to the housing 16 on an internal surface thereof or are formed integrally with the housing. The deforming elements 24 are connected to, or form a part of the expansible chamber 20. The deforming elements 24 are disposed opposite the anvil elements 22. Together the deforming and anvil elements 22, 24 are configured to deform the at least one regulator inlet conduit 18 to modify the cross sectional area of the at least one regulator inlet conduit 18 in response to a change in pressure in the expansible chamber 20. The deforming and anvil elements 22, 24 in effect act as a tourniquet on the inlet conduits 18 to regulate the outlet pressure (Pout)

The expansible chamber 20 is made of a flexible material and is configured to expand and contract elastically in response to changes in the pressure (Preg) in the chamber 20. When the pressure (Preg) in the chamber 20 is high the chamber 20 expands and when the pressure (Preg) in the chamber is low the chamber 20 contracts. The expansible chamber 20 may be of a balloon type construction or a bellows, or any other construction that is able to elastically expand and contract under high pressure.

Figure 2A:
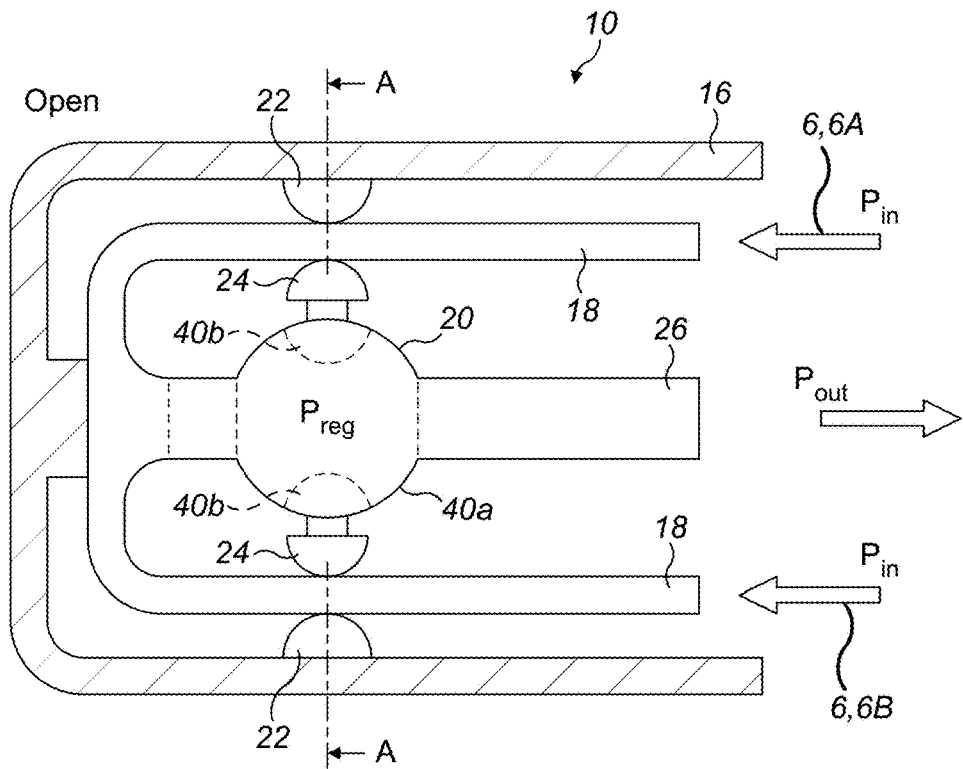
FIG. 2A schematically illustrates a first embodiment of fluid pressure regulator for use in the system of FIG. 1 in an open configuration.

As shown in FIG. 2A, when the pressure (Preg) is relatively low, the pressure regulator 10 is in a fully open position, and the deforming elements 24 do not deform the regulator inlet conduits 18.

Figure 2B:
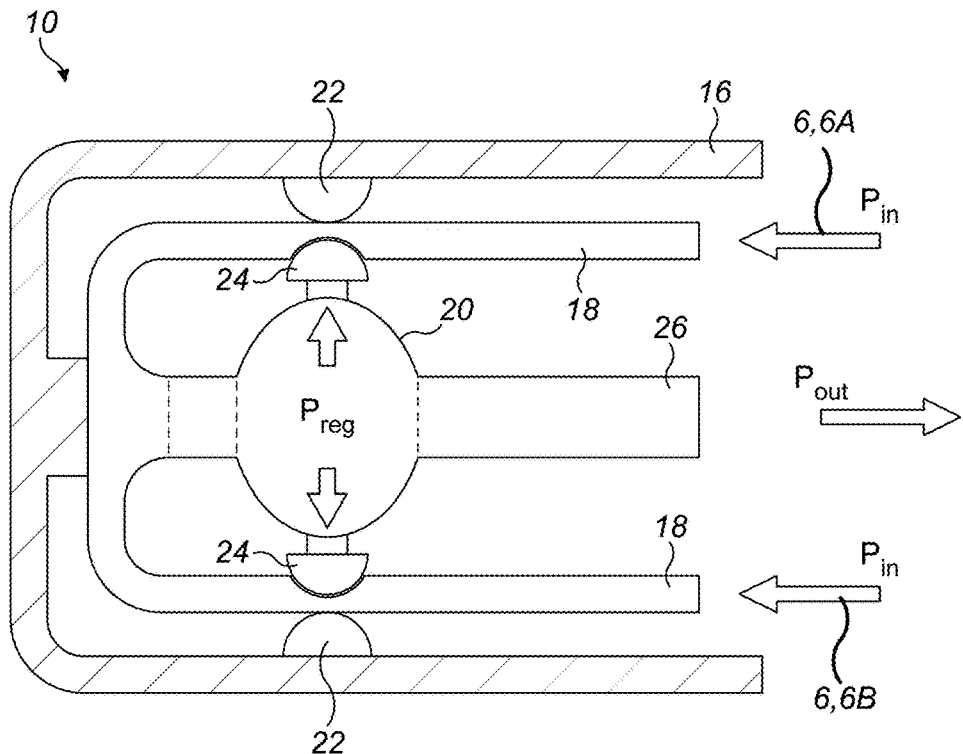
FIG. 2B schematically illustrates the fluid pressure regulator of FIG. 2A in a closed configuration.

As shown in FIG. 2B, when the pressure (Preg) in the expansible chamber 20 is relatively high, the chamber 20 expands against the hoop stiffness of the expansible chamber 20 so as to move the deforming elements 24 toward the anvil elements 22, thereby deforming the regulator inlet conduits 18 to reduce the cross sectional area thereof. This will modulate the pressure in the (Preg) in the expansible chamber 20. When the pressure (Preg) in the expansible chamber 20 drops, the expansible chamber 20 will contract, thereby retracting the deforming elements 24 away from the anvil elements 22, thereby opening the inlet conduits 18 once more.

The result of the above described arrangement is that the outlet pressure (Pout) remains substantially steady despite fluctuations in the inlet pressure (Pin) from the pressurised fluid source 6, 6a, 6b. The system responds dynamically to changes in the inlet pressure (Pin) to produce a steady outlet pressure (Pout).

Figure 3:
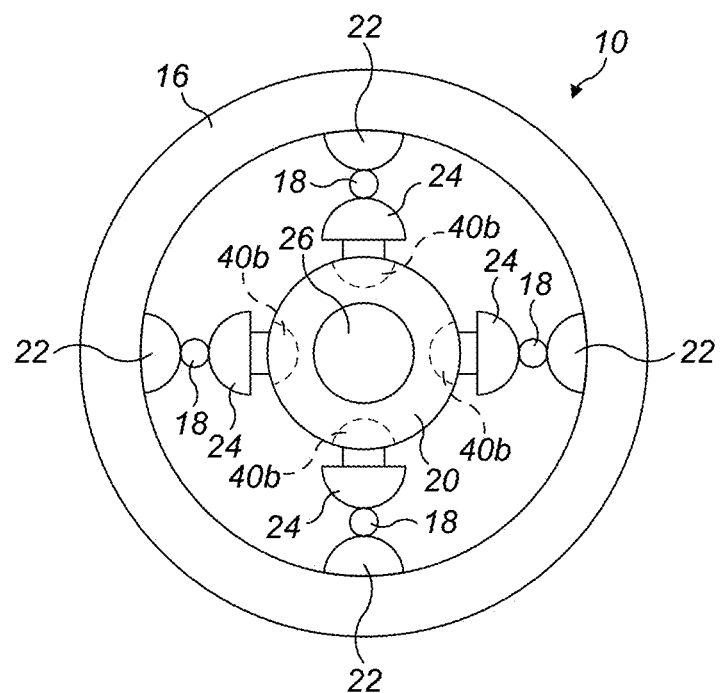
FIG. 3 schematically illustrates a cross-sectional view of a second embodiment of fluid pressure regulator when viewed in plane A-A of FIG. 2A.
Figure 4:
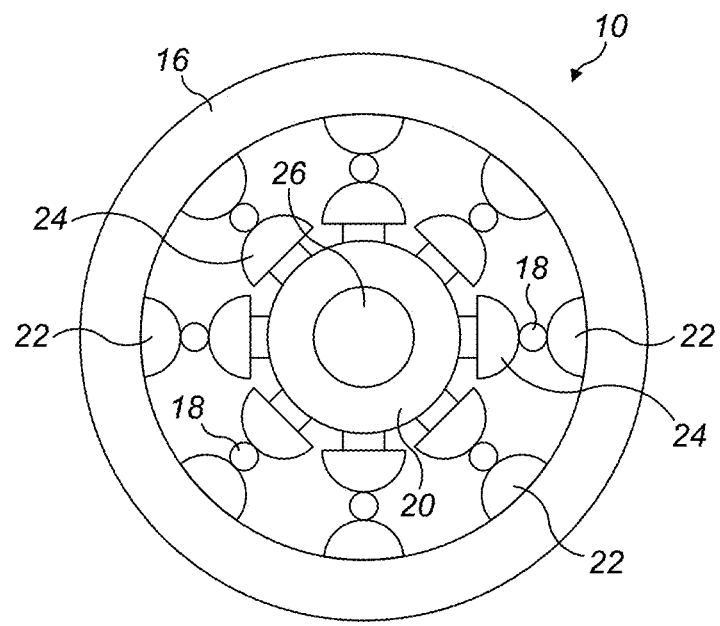
FIG. 4 schematically illustrates a cross-sectional view of a third embodiment of the fluid pressure regulator when viewed in plane A-A of FIG. 2A.

As shown in FIGS. 3 and 4, the pressure regulator 10 may have different numbers of regulator inlet conduits 18 and associated anvil and deforming elements 22, 24. Illustrated in these figures are embodiments with four and eight regulator inlet conduits 18; however, a different quantity of regulator inlet conduits 18 may be used in other embodiments.

The regulator outlet conduit 26 is connected to the outlet passage 12, which in turn is connected to the aspirator 14.

Gas flow from the regulator outlet conduit 26 passes through a Venturi in the aspirator 14. Air is entrained into a throat of the aspirator 14 due to the reduced pressure at the throat. The volume of air induced is larger than that of the regulated fluid flow and it is primarily this air which inflates the slide 4.

The pressure regulator 10 may be additively manufactured, such as by 3D printing. This may reduce manufacturing costs and time when compared to prior art regulators. It may also enable mass reduction by topology optimisation.

The expansible chamber 20 may be made of a metallic material, an elastomeric material or a composite material.

In standard operation the expansible chamber 20, or portions thereof, expands elastically under pressure and contracts elastically toward its original shape and size when the pressure is reduced. However, when the pressure is increased to a level high enough to cause the material of the expansible chamber 20 to plastically yield, the chamber 20 will yield. Thereafter, when pressure is again reduced, the expansible chamber 20 will not return to its original size and shape. The pressure regulator 10 may thereby act as a safety cut-off valve when the inlet pressure is above a predetermined threshold.

It will be understood that the above description is of just one embodiment in accordance with the disclosure and that modifications may be made thereto without departing from the scope of the disclosure.

For example, in a further embodiment, the expansible chamber 20 may include a non-expansible portion 40a and one or more expansible portions 40b, illustrated schematically in FIGS. 2A and 3. These expansible portions 40b may comprise peripheral, expansible wall portions at circumferential positions corresponding to fluid inlet conduits 18, or a circumferential wall portion spanning more than one fluid inlet conduit 18. As illustrated, in this example, the expansible portions 40b are connected to the deforming elements 24 and thereby the expansible portions 40b can modify the cross section of the fluid inlet conduits 18 upon expansion. It alternative embodiments, the expansible portions may themselves comprise a balloon or bellows construction.

While the pressure regulators in the embodiments described above are in relation to an aircraft evacuation system, it is noted that these fluid pressure regulators may also be used in alternative applications. They do not, therefore need to be attached to an aspirator but could simply act to regulate the flow of fluid through a conduit system.

The invention claimed is:

1. A fluid pressure regulator comprising:
    at least one fluid inlet conduit for connection to a pressurised fluid source;
    an outlet conduit; and
    an elastically expansible chamber arranged between and fluidly connected in series to the at least one fluid inlet conduit and the outlet conduit, such that the elastically expansible chamber is configured to receive fluid from the fluid inlet conduit at one side of the elastically expansible chamber and to expel fluid to the outlet conduit at an opposite side of the elastically expansible chamber, the elastically expansible chamber being configured to elastically deform the at least one fluid inlet conduit upon expansion to modify the cross sectional area of the at least one fluid inlet conduit;
wherein the expansible chamber comprises a balloon and wherein the expansible chamber before expansion has a cross-sectional area larger than the cross-sectional area of the inlet and outlet conduits.

2. The pressure regulator of claim 1, wherein the elastically expansible chamber comprises at least one deforming element on an external surface thereof for engaging a respective fluid inlet conduit.

3. The pressure regulator of claim 2, further comprising a housing surrounding the at least one fluid inlet conduit and the outlet conduit, wherein the housing comprises at least one anvil element on an internal surface thereof opposed to the deforming element whereby the fluid inlet conduit is deformed between the deforming element and the anvil element.

4. The pressure regulator of claim 1, further comprising a housing surrounding the at least one fluid inlet conduit and the outlet conduit.

5. The pressure regulator of claim 1, wherein the expansible chamber comprises a flexible material.

6. The pressure regulator of claim 5, wherein the expansible chamber is elastomeric.

7. The pressure regulator of claim 1, wherein the pressure regulator is additively manufactured.

8. An aircraft evacuation system comprising:
an inflatable evacuation slide;
the fluid pressure regulator of claim 1; and
a pressurised fluid source connected to the at least one inlet conduit of the pressure regulator, wherein the system is configured to inflate the evacuation slide using flow from the outlet conduit of the pressure regulator.

9. The aircraft evacuation system of claim 8, comprising:
an aspirator wherein the system is configured to inflate the evacuation slide by the flow from the outlet conduit of the pressure regulator inducing a pressure differential in the aspirator to induce air into the evacuation slide.

10. A fluid pressure regulator comprising:
at least one fluid inlet conduit for connection to a pressurised fluid source;
an outlet conduit;
an elastically expansible chamber arranged between and fluidly connected in series to the at least one fluid inlet conduit and the outlet conduit, such that the elastically expansible chamber is configured to receive fluid from the fluid inlet conduit at one side of the elastically expansible chamber and to expel fluid to the outlet conduit at an opposite side of the elastically expansible chamber, the elastically expansible chamber being configured to elastically deform the at least one fluid inlet conduit upon expansion to modify the cross sectional area of the at least one fluid inlet conduit; and
a plurality of fluid inlet conduits, each deformable by the elastically expansible chamber upon expansion thereof.

11. The pressure regulator of claim 10, wherein the fluid inlet conduits are circumferentially symmetrically arranged about a centreline of the outlet conduit.

12. The pressure regulator of claim 10, comprising a manifold connecting the fluid inlet conduits.

13. The pressure regulator of claim 10, wherein the expansible chamber comprises a non-expansible portion and at least one expansible portion, wherein each of the at least one expansible portions is configured upon expansion to modify the cross sectional area of a respective one of the at least one fluid inlet conduits.

14. A fluid pressure regulator comprising:
at least one fluid inlet conduit for connection to a pressurised fluid source;
an outlet conduit; and
an elastically expansible chamber arranged between the at least one fluid inlet conduit and the outlet conduit, the elastically expansible chamber being configured to elastically deform the at least one fluid inlet conduit upon expansion to modify the cross sectional area of the at least one fluid inlet conduit, wherein the at least one fluid inlet conduit, the outlet conduit and the elastically expansible chamber are arranged such that the direction of fluid flow through the at least one fluid inlet conduit is opposite to the direction of fluid flow through the elastically expansible chamber and through the outlet conduit, wherein the elastically expansible chamber has a fluid inlet and a fluid outlet, the fluid outlet of the expansible chamber being separate from the fluid inlet of the expansible chamber, wherein the expansible chamber comprises a balloon and wherein the expansible chamber before expansion has a cross-sectional area larger than the cross-sectional area of the inlet and outlet conduits.

15. A fluid pressure regulator comprising:
a plurality of fluid inlet conduits for connection to a pressurised fluid source;
an outlet conduit; and
an elastically expansible chamber arranged between at least one fluid inlet conduit of the plurality of fluid inlet conduits and the outlet conduit, the elastically expansible chamber being configured to elastically deform the at least one fluid inlet conduit upon expansion to modify the cross sectional area of the at least one fluid inlet conduit, wherein each of the plurality of fluid inlet conduits is deformable by the elastically expansible chamber upon expansion thereof, wherein the fluid inlet conduits are circumferentially symmetrically arranged about a centreline of the outlet conduit, wherein the elastically expansible chamber is arranged between the fluid inlet conduits on the centreline of the outlet conduit.

* * * * *